(No Model.)

C. B. CLUGSTON.
NUT LOCK.

No. 244,857. Patented July 26, 1881.

Witnesses:
H. C. McArthur
Will Mallory

Inventor
Columbus B. Clugston,
per Chas. H. Fowler,
Attorney.

UNITED STATES PATENT OFFICE.

COLUMBUS B. CLUGSTON, OF UTICA, ILLINOIS.

NUT-LOCK.

SPECIFICATION forming part of Letters Patent No. 244,857, dated July 26, 1881.

Application filed June 6, 1881. (No model.)

*To all whom it may concern:*

Be it known that I, COLUMBUS BYERS CLUGSTON, a citizen of the United States, residing at Utica, in the county of La Salle and State of Illinois, have invented certain new and useful Improvements in Nut-Locks; and I do hereby declare that the following is a full, clear, and exact description of the same, reference being had to the annexed drawings, making a part of this specification, and to the letters and figures of reference marked thereon.

Figure 1:
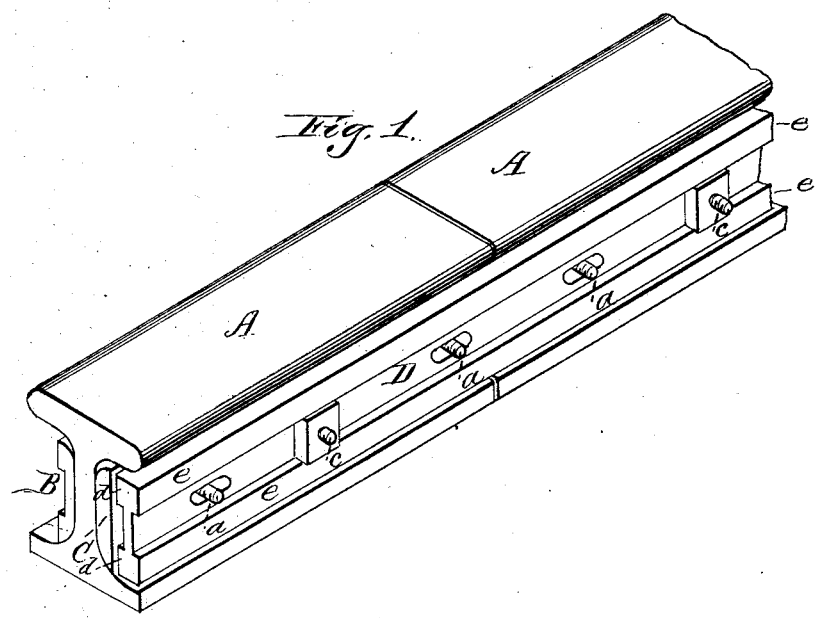
Figure 2:
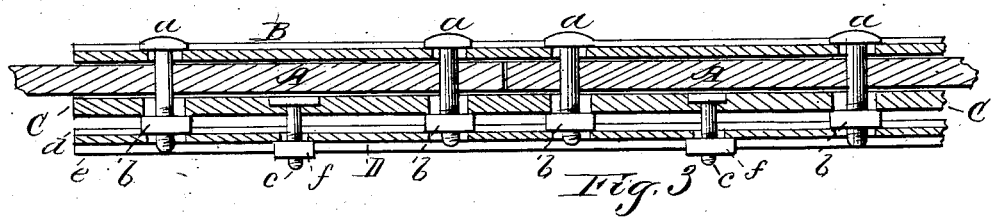
Figure 3:
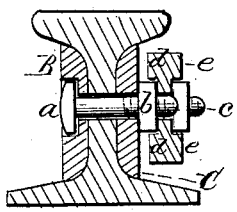

Figure 1 is a perspective view of my invention; Fig. 2, a horizontal central section, and Fig. 3 a transverse sectional view.

The present invention has relation to certain new and useful improvements in nut-locks for railroad-joints, and refers more particularly to that class in which a bar having elongated slots and projecting flanges is used in connection with the usual fish-plates, the bolts passing through the slots in the bar, and the screw-nuts prevented from turning by the flanges thereon.

The invention consists in the details of construction substantially as shown in the drawings and hereinafter described.

In the accompanying drawings, A represents the adjacent ends of two railroad-rails, and B C the fish-plates fitted to the sides of the rails between the upper and lower flanges thereof. The fish-plate B is recessed upon its outer side to receive the heads of the usual bolts, $a$, said bolts passing through the rails and through elongated slots in both fish-plates. The fish-plates B C are held against the sides of the rails A by the bolts $a$ and screw-nuts $b$ engaging with the screw-threaded ends of the bolts. The fish-plate C has short screw-bolts $c$ passing through it, the heads thereof being seated upon the inner side of said plate, the screw-threaded portion of the bolts passing through elongated slots in a bar, D. This locking-bar D has projecting flanges $d\ e$ upon both its inner and outer sides, said flanges running the entire length of the bar at its top and bottom.

Between the flanges $d$ are located the nuts $b$, which hold them from turning on the bolts $a$, while the flanges $e$ hold the nuts $f$ from turning on the bolts $c$, said bolts and nuts securely fastening the locking-bar D to the fish-plate C. When the locking-bar D is placed over the ends of the bolts $c$, and the nuts $b$ of the bolts $a$ are properly seated between the flanges $d$, the nuts $f$ are placed upon the ends of bolts $c$, and by a suitable wrench the nuts are screwed tight, and when they come square with the recess formed by the flanges $e$ the locking-bar will spring back against the inner side of the nuts and the flanges, thus securely holding and preventing them from turning until forced out of recess again by a wrench.

The locking-bar D, unlike those heretofore in use, has flanges upon both sides, said flanges being continuous throughout the entire length of the bar, forming a locking device for both the nuts $b\ f$.

Having now fully described my invention, what I claim as new, and desire to secure by Letters Patent, is—

The combination, with the fish-plates B C and bolts and nuts $a\ b$, of the locking-bar D, having flanges $d\ e$ upon both its sides and extending its entire length, and the bolts $c$, connected to the fish-plate C and passing through the locking-bar, and the nuts $f$ for securing it to the fish-plate, substantially as and for the purpose set forth.

In testimony that I claim the above I have hereunto subscribed my name in the presence of two witnesses.

COLUMBUS BYERS CLUGSTON.

Witnesses:
PETER COSGROVE,
JOHN P. HAZEL.